US012784371B2

(12) United States Patent
Govindan et al.

(10) Patent No.: US 12,784,371 B2
(45) Date of Patent: Nov. 3, 2026

(54) HUMAN-CENTRIC VEHICULAR METAVERSE PLATFORM FOR ROAD-SIDE AR/VR CONTENT DELIVERY

(71) Applicants: GM GLOBAL TECHNOLOGY OPERATIONS LLC, Detroit, MI (US); UNIVERSITY OF SOUTHERN CALIFORNIA, Los Angeles, CA (US)

(72) Inventors: Ramesh Govindan, Cerritos, CA (US); Fan Bai, Ann Arbor, MI (US); Chuan Li, Troy, MI (US); Christina Shin, Irvine, CA (US); Chunyu Xia, Los Angeles, CA (US); Harsha V. Madhyast, Cerritos, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 121 days.

(21) Appl. No.: 18/599,076

(22) Filed: Mar. 7, 2024

(65) Prior Publication Data

US 2025/0285381 A1 Sep. 11, 2025

(51) Int. Cl.

*G06T 19/00* (2011.01)
*G06F 3/01* (2006.01)
*G06T 15/40* (2011.01)
*G06T 17/20* (2006.01)

(52) U.S. Cl.

CPC .............. *G06T 19/00* (2013.01); *G06F 3/012* (2013.01); *G06T 15/40* (2013.01); *G06T 17/20* (2013.01); *G06T 2210/36* (2013.01)

(58) Field of Classification Search

None

See application file for complete search history.

(56) References Cited

U.S. PATENT DOCUMENTS

| | | | | |
|---|---|---|---|---|
| 10,242,457 | B1 * | 3/2019 | Sibley | H04N 9/3182 |
| 11,709,069 | B2 * | 7/2023 | Kim | G06V 20/588<br>701/436 |
| 2010/0023234 | A1 * | 1/2010 | Kameyama | B60W 30/08<br>701/1 |
| 2014/0362195 | A1 * | 12/2014 | Ng-Thow-Hing | G06V 40/20<br>348/51 |
| 2018/0082431 | A1 * | 3/2018 | Andersson | G06T 1/60 |
| 2020/0234497 | A1 * | 7/2020 | Fueki | G06T 13/20 |
| 2021/0166490 | A1 * | 6/2021 | Piemonte | G02B 27/017 |
| 2022/0392135 | A1 * | 12/2022 | Cundall | H04L 51/10 |
| 2023/0206544 | A1 * | 6/2023 | Shkurko | G06T 15/06<br>345/418 |

(Continued)

FOREIGN PATENT DOCUMENTS

DE 112018004583 T5 8/2020

*Primary Examiner* — Saptarshi Mazumder

(74) *Attorney, Agent, or Firm* — Ingrassia Fisher & Lorenz, LLP | IFL

(57) ABSTRACT

In an exemplary embodiment, a system is provided that includes one or more sensors and a processor. The one or more sensors are configured to obtain sensor data for a vehicle. The processor is coupled to the one or more sensors, and is configured to at least facilitate selecting, using the sensor data, a physical target that includes a physical element in proximity to the vehicle as the vehicle is travelling; generating virtual content based on the sensor data; and delivering the virtual content for one or more users of the vehicle as an overlay to the physical target.

11 Claims, 5 Drawing Sheets

(56) References Cited

U.S. PATENT DOCUMENTS

| | | | | |
|---|---|---|---|---|
| 2023/0224482 | A1* | 7/2023 | Takahashi .............. | H04N 19/70 |
| 2023/0298217 | A1* | 9/2023 | Rondao Alface .... | H04N 21/816 382/232 |

* cited by examiner

HUMAN-CENTRIC VEHICULAR METAVERSE PLATFORM FOR ROAD-SIDE AR/VR CONTENT DELIVERY

INTRODUCTION

The technical field generally relates to vehicles and, more specifically, to methods and systems for providing content for users in a vehicle.

Vehicle users (e.g., passengers) today may experience roadside content, such as billboards and the like along the roadside. However, the roadside content may not always be presented to the users in an optimal manner.

Accordingly, it is desirable to provide improved methods and systems for providing content for users of a vehicle. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is disclosed that includes obtaining sensor data from one or more sensors of a vehicle; selecting, via a processor using the sensor data, a physical target that includes a physical element in proximity to the vehicle as the vehicle is travelling; generating, via the processor, virtual content based on the sensor data; and delivering the virtual content for one or more users of the vehicle as an overlay or in an augmented manner with respect to the physical target.

Also in an exemplary embodiment, the sensor data includes image sensor data, location sensor data, and inertial measurement unit (IMU) sensor data obtained from the vehicle; the method further includes generating, via the processor, a head pose and a vehicle pose, based on the image sensor data, the location sensor data, and the IMU sensor data obtained from the vehicle; and the generating of the virtual content is performed using the head pose and the vehicle pose.

Also in an exemplary embodiment, the generating of the virtual content is performed further using a three dimensional image database that is stored in a computer storage, in combination with the head pose and the vehicle pose.

Also in an exemplary embodiment, the virtual content is displayed for the one or more users of the vehicle on one or more display devices inside the vehicle.

Also in an exemplary embodiment, the physical target includes a billboard along a roadway in which the vehicle is travelling; and the virtual content is overlayed over, or displayed in an augmented manner with respect to, the billboard as displayed inside the vehicle for the one or more users.

Also in an exemplary embodiment, the physical target includes a traffic control device (TCD) along a roadway in which the vehicle is travelling; and the virtual content is overlayed over, or displayed in an augmented manner with respect to, the TCD as displayed inside the vehicle for the one or more users.

Also in an exemplary embodiment, the physical target comprises a point of interest along a roadway in which the vehicle is travelling; and the virtual content is overlayed in an augmented manner with respect to, the point of interest.

Also in an exemplary embodiment, the physical target comprises a road condition object along a roadway in which the vehicle is travelling; and the virtual content is overlayed over, or presented in an augmented manner with respect to, the road condition object, as displayed inside the vehicle for the one or more users.

Also in an exemplary embodiment, the delivering of the virtual content utilizes a level of detail of a three dimensional (3D) mesh that is delivered from a remote system to the vehicle; and the level of detail is selected based on a distance between the physical target and the vehicle.

Also in an exemplary embodiment, the level of detail is selected further based upon an available network bandwidth or one or more other quality of experience (QOE) metrics.

Also in an exemplary embodiment, the method further includes performing, via the processor, frustum and back-face culling of the 3D mesh.

In another exemplary embodiment, a system is provided that includes one or more sensors and a processor. The one or more sensors are configured to obtain sensor data for a vehicle. The processor is coupled to the one or more sensors, and is configured to at least facilitate selecting, using the sensor data, a physical target that includes a physical element in proximity to the vehicle as the vehicle is travelling; generating virtual content based on the sensor data; and delivering the virtual content for one or more users of the vehicle as an overlay over, or a display in an augmented manner with respect to, to the physical target.

Also in an exemplary embodiment, the one or more sensors include a plurality of sensors that are configured to obtain the sensor data, the sensor data including image sensor data, location sensor data, and inertial measurement unit (IMU) sensor data obtained from the vehicle; and the processor is further configured to at least facilitate generating a head pose and a vehicle pose, based on the image sensor data, the location sensor data, and the IMU sensor data obtained from the vehicle; and generating the virtual content using the head pose and the vehicle pose.

Also in an exemplary embodiment, the processor is further configured to at least facilitate generating the virtual content using a three dimensional image database that is stored in a computer storage, in combination with the head pose and the vehicle pose.

Also in an exemplary embodiment, the virtual content is displayed for the one or more users of the vehicle on one or more display devices inside the vehicle.

Also in an exemplary embodiment, the physical target includes a billboard along a roadway in which the vehicle is travelling; and the virtual content is overlayed over, or displayed in an augmented manner with respect to, the billboard as displayed inside the vehicle for the one or more users.

Also in an exemplary embodiment, the delivering of the virtual content utilizes of level of detail of a three dimensional (3D) mesh that is delivered from a remote system to the vehicle; and the level of detail is selected based on a distance between the physical target and the vehicle.

Also in an exemplary embodiment, the level of detail is further based upon an available network bandwidth or one or more other quality of experience (QOE) metrics.

Also in an exemplary embodiment, the processor is further configured to at least facilitate performing, via the processor, frustum and back-face culling of the 3D mesh.

In another exemplary embodiment, a system is provided that includes a plurality of sensors, a processor, and a display device. The plurality of sensors are configured to obtain sensor data for a vehicle, the sensor data including image sensor data, location sensor data, and inertial measurement unit (IMU) sensor data obtained from the vehicle. The processor is coupled to the plurality of sensors, and is configured to at least facilitate selecting, using the sensor data, a physical target that includes a physical element in proximity to the vehicle as the vehicle is travelling; generating a head pose and a vehicle pose, based on the image sensor data, the location sensor data, and the IMU sensor data obtained from the vehicle; generating virtual content using the head pose and the vehicle pose; and providing instructions for delivering the virtual content for one or more users of the vehicle as an overlay to the physical target or in an augmented manner with respect to the physical target. The display device is configured to display the virtual content, overlayed on the physical target or as otherwise augmented with respect to the virtual content, inside the vehicle for the one or more users in accordance with the instructions provided by the processor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
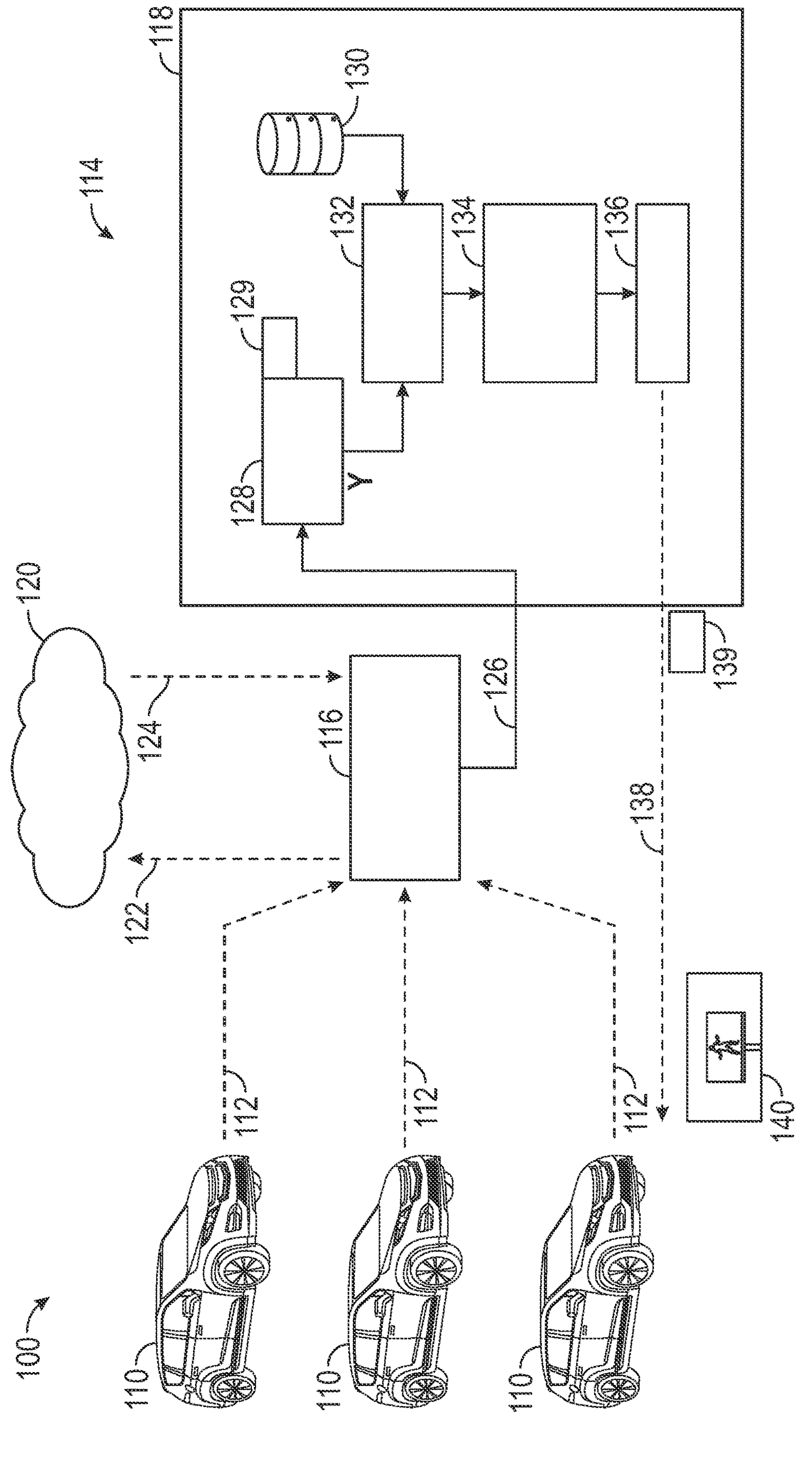
FIG. 1 provides an overview of a platform and process 100 for delivering content for users of a vehicle, including an overlay of or augmented presentation of virtual content with a physical element near the vehicle, in accordance with exemplary embodiment.

FIG. 1 provides an overview of a platform and process 100 for delivering content for users of a vehicle 110, including an overlay or augmented presentation of virtual content with a physical element near the vehicle, in accordance with an exemplary embodiment. In accordance with an exemplary embodiment, the platform and process 100 are also implemented in connection with the system 200 of FIG. 2 and various implementations of FIGS. 3-7, as described further below.

As depicted in FIG. 1, the platform and process 100 (collectively referred to as the "process 100" for ease of reference) may be utilized in connection with multiple vehicles 110. In various embodiments, for each vehicle 110, the process 100 utilizes sensor data (including location, IMU, and image data) from the vehicle 110 in generating virtual content (e.g., enhanced reality or virtual reality) that is overlayed onto or provided an augmented manner with respect to one or more physical elements (e.g., a billboard, a road sign or other traffic control device (TCD), point of interest, road condition objects, or one or more other roadside elements) for display for one or more users of the vehicle 110, as described in greater detail below.

In various embodiments, each vehicle 110 includes an automobile. The vehicle 110 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 110 may also comprise a motorcycle or other vehicle, such as aircraft, spacecraft, watercraft, and so on, and/or one or more other types of mobile platforms (e.g., a robot and/or other mobile platform).

Figure 2:
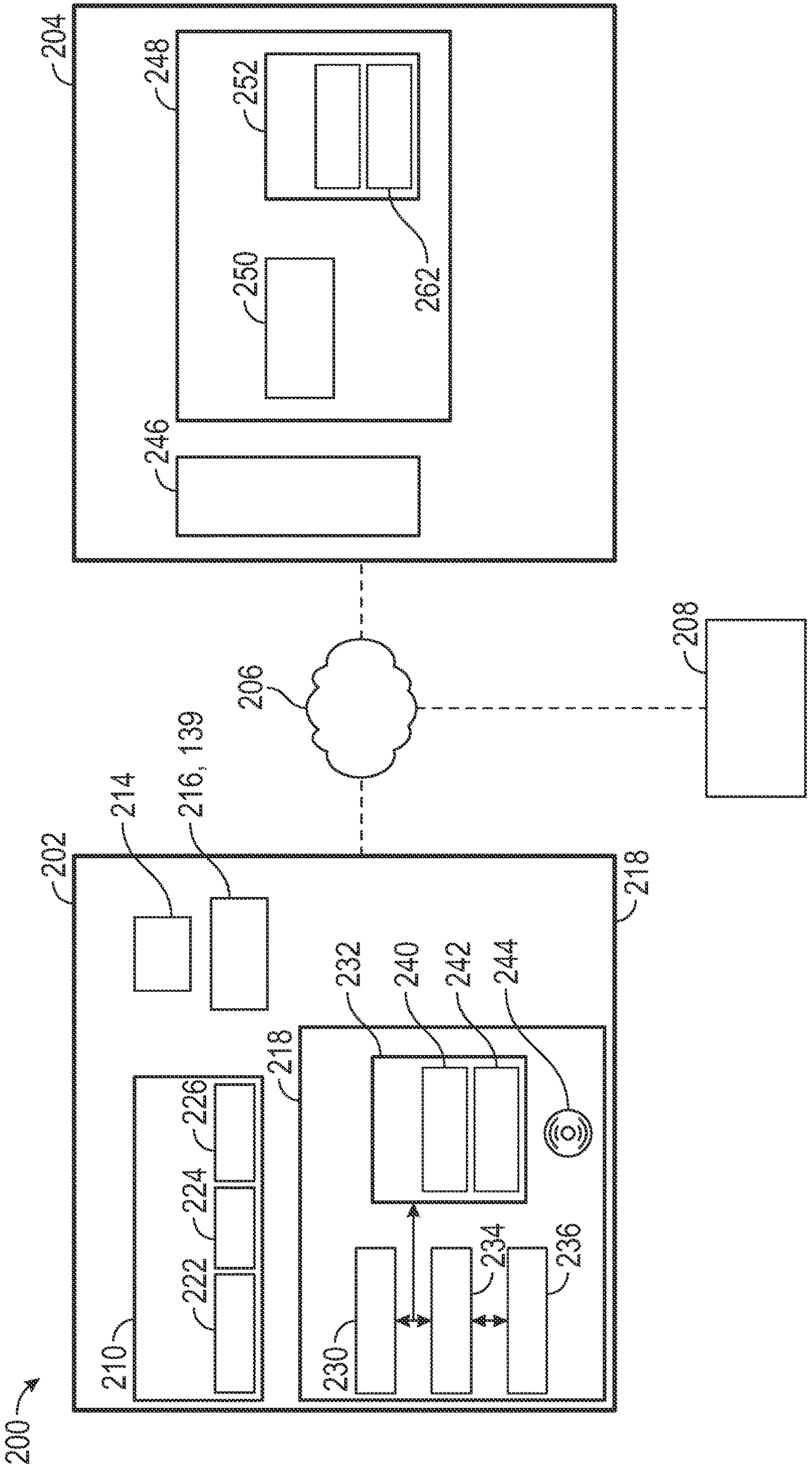
FIG. 2 is a functional block diagram of a system for delivering content for users of a vehicle, and that can be used for implementation of the process of FIG. 1, in accordance with exemplary embodiments.

As depicted in FIG. 1, in various embodiments sensor data 112 is provided from each vehicle 110 to a remote center 114 for processing. In certain embodiments, the sensor data 112 includes location data (e.g., including global positioning system (GPS) data); inertial measurement unit (IMU) sensor data, and image data (e.g., from a driver or passenger monitoring system or an image of a vehicle front-view scene) from the vehicle 110. In various embodiments, the sensor data 112 is obtained from a sensor array 210 of the vehicle 110 (depicted in FIG. 2 and described further below in connection therewith) and is sent to the remote center 114. Also in certain embodiments, the center 114 comprises one or more remote servers (e.g., remote system 204 that is depicted in FIG. 2 and described further below in connection therewith) that are physically remote from the vehicle 110.

As depicted in FIG. 1, in various embodiments, the sensor data 112 is provided to a localization module 116. Also in various embodiments, the localization module 116 provides information from the sensor data 122 (e.g., in various embodiments, the raw sensor data 122 and/or filtered sensor data 122) to a cloud service 120 for localization, and receives a vehicle pose 124 from the cloud service 120. In various embodiments, the cloud service 120 and other remote communications are performed via one or more wireless communication networks 206 (as depicted in FIG. 2).

Also in various embodiments, the localization module 116 generates pose data 126 based on both the vehicle pose 124 and the sensor data 122, and provides the pose data 126 to a delivery module 118 for further processing. In various embodiments, the pose data 126 provided from the localization module 116 to the delivery module 118 includes both a vehicle pose (e.g., a position and rotation of the vehicle 110) and a head pose (e.g., a position and rotation of the head of a driver and/or one or more other users of the vehicle 110). In various embodiments, the heads pose also include an eye gaze of the user (e.g., driver), such as including a direction of a user's gaze from one or more eyes of the user.

In various embodiments, the localization module 116 generates the pose data 126 with six degrees of freedom (DOF) in a World Coordinate System (WCS). In one exemplary embodiment, the WCS corresponds to a global positioning system (GPS) coordinate system. In various embodiments, the localization module 116 utilizes camera images (e.g., from the sensor data 112) along with a pre-built Structure from Motion (SfM) model (e.g., as a program stored in a computer memory 232 and/or 252 of FIG. 2) database images from computer memory (e.g., from one or more stored values 242 and/or 262 of FIG. 2 and/or as otherwise stored in the cloud). In one example, the SfM model generates a three dimensional (3D) point cloud that lifted from two dimensional (2D) image feature points. It will be noted that in various embodiments the cloud-side 3D map database may be built using other techniques than SfM, including one or more advanced map scanning techniques that generate 3D mesh.

In addition, in certain embodiments, the head pose and the vehicle pose of the pose data 126 are generated via (i) image retrieval; (ii) feature matching; (iii) lifting; and (iv) pose estimation. In certain embodiments, the image retrieval includes retrieving relevant database images based on query image via exhaustive search or nearest neighbor search. Also in certain embodiments, the matching comprises two dimensional (2D) feature extraction and feature matching between retrieved images (e.g., from the database) and the camera image. Also in certain embodiments, the lifting comprises lifting two dimensional (2D) images to three dimensional (3D) images, including by looking up 3D points corresponding to 2D features from the SfM point cloud. In addition, also in certain embodiments, the pose estimation comprises regressing a six degrees of freedom (6 DOF) pose from 2D-to-3D pairs via Perspective-n-Point (PnP) and a Random Sample Consensus (RANSAC) algorithm.

Also in various embodiments, camera calibration is performed (e.g., with respect to one or more cameras of a driver monitoring system) to ensure that the head pose is provided in connection with the WCS. In certain exemplary embodiments, a transformation is provided (e.g., via transformation matrix) to convert the head pose from a driver monitoring system (DMS) coordinate system to the WCS (e.g., using a transformation matrix). Also in various embodiments, the vehicle pose is similarly converted to the WCS.

For example, in certain embodiments, the head pose is generated from a driver monitoring system (DMS) as $H_d$, and the vehicle pose is obtained in the WCS as $V_w$, both as inputs. In various embodiments, a calibration is performed as a relative transformation between the vehicle and the DMS as $T_r$.

In various embodiments, as an output, the head pose is generated in the WCS as $H_w$. Also in various embodiments, the head pose in the DMS is converted to the head pose in the WCS via the vehicle pose in WCS (as mentioned above) and the calibration between DMS and vehicle, in accordance with the following equation:

$$H_w = V_w \odot (T_r \odot H_d), \quad \text{(Equation 1)}$$

in which "$\odot$" represents matrix multiplication. In various embodiments, the head pose in the DMS coordinates can be viewed as a transformation matrix between the head pose and DMS, such that the head pose in the WCS is calculated by applying two transformation matrices (one between the head pose and the DMS, and the other between the DMS and the vehicle). Also in various embodiments, the relative transformation between vehicle and the DMS is obtained during calibration step.

With continued reference to FIG. 1, in various embodiments the pose data 126 (including the head pose and the vehicle pose) are provided to the delivery module 118 as noted above. In various embodiments, target selection 128 is performed using the pose data 126. Specifically, in various embodiments, the target selection 128 results in a physical target 129 of one or more physical elements along the roadside for the overlay of virtual content for viewing by one or more users inside the vehicle and/or for displaying the virtual content in an augmented fashion with respect to the one or more physical elements.

In various embodiments, the target selection utilizes, as inputs, the camera images, along with the head pose and target position in WCS, and an aerial mesh. Also in various embodiments, as the output, the target selection 128 selects one or more physical elements along the roadway in which the vehicle is travelling to overlay the virtual content over the physical clement and/or for displaying the virtual content in an augmented fashion with respect to the one or more physical elements. In one embodiment, the target comprises a billboard along the roadway. In other embodiments, the target may comprise any number of other types of physical elements along the roadway, such as by way of example one or more traffic control devices (TCD) (e.g., traffic signs, traffic lights, cross-walk markers, and so on), one or more points of interest (e.g., restaurants, gas stations, service stations, hotels, stores, travel destinations, and/or or other points of interest, such as for providing augmented reality (AR) therefor), and/or one or more road condition objects (e.g., potholes, slippery roads, traffic events, gestion, and so on), and/or other roadside physical elements.

Figure 3:
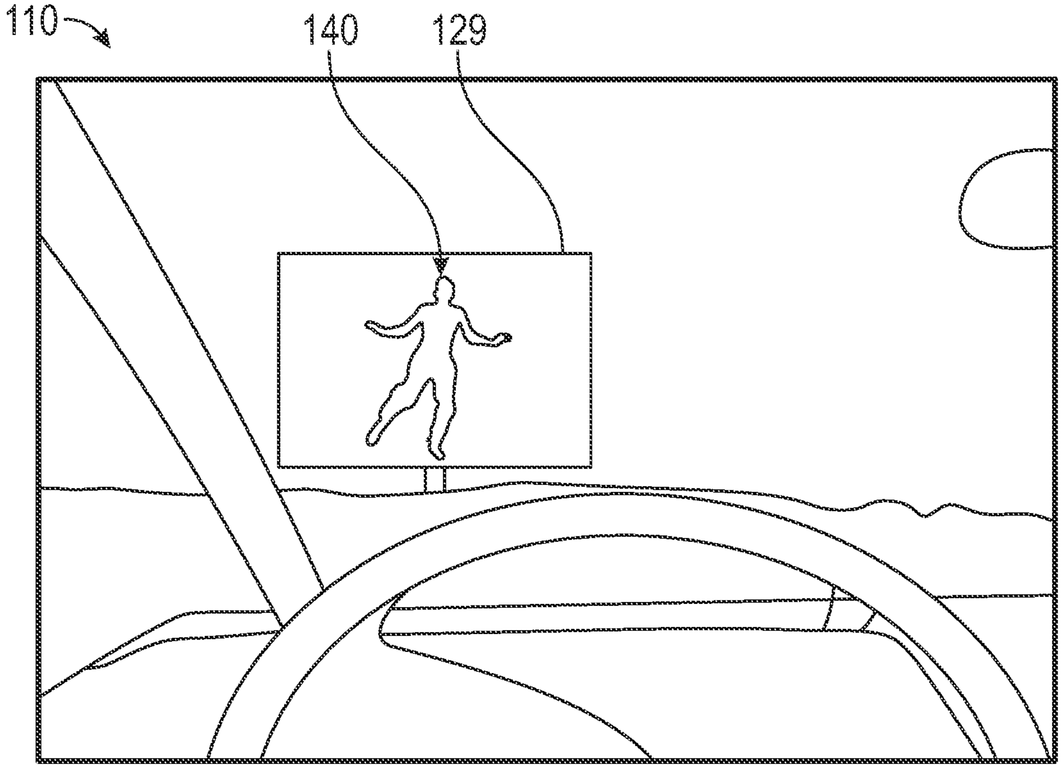
FIG. 3 depicts an exemplary implementation of content delivered by the system of FIG. 2 via the platform and process of FIG. 1, in accordance with an exemplary embodiment.

With reference to FIG. 3, in one exemplary embodiment, the target 129 comprises a billboard that is along the roadway in which the vehicle 110 is travelling. As depicted in FIG. 3, in an exemplary embodiment, a display 140 is provided for users inside the vehicle 110, such that the display 140 comprises an overlay of virtual content over the target 129. As noted above, in various embodiments, the display 140 may include an overlay of the virtual content over the physical element and/or for displaying the virtual content in an augmented fashion with respect to the one or more physical elements. Also as noted above, in various embodiments, the target 129 may include, in addition to a billboard along the roadway, one or more traffic control devices (TCD) (e.g., traffic signs, traffic lights, cross-walk markers, and so on), one or more points of interest (e.g., restaurants, gas stations, service stations, hotels, stores, travel destinations, and/or or other points of interest, such as for providing augmented reality therefor), and/or one or more road condition objects (e.g., potholes, slippery roads, traffic events, gestion, and so on), and/or other roadside physical elements, among other possible physical elements.

Figure 4:
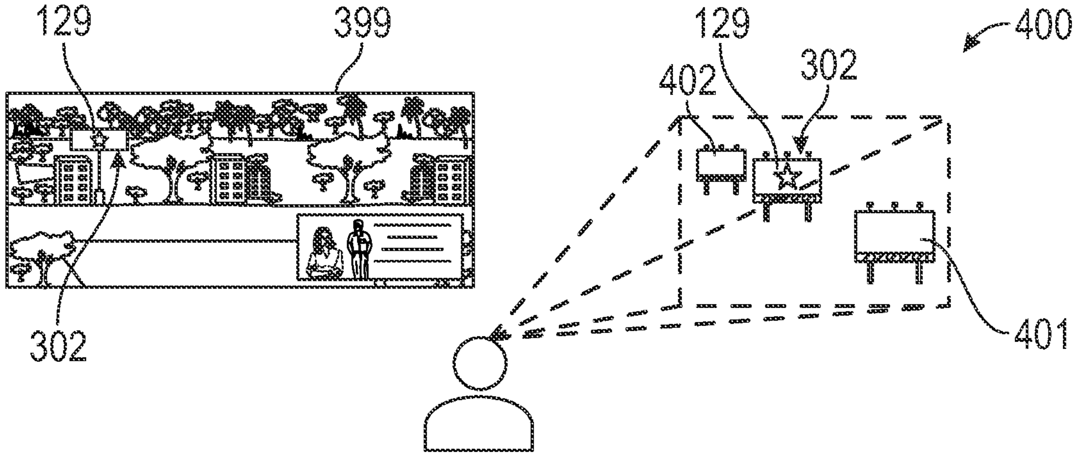
FIG. 4 depicts an exemplary implementation of the selection of a physical target for overlay or augmented presentation of the virtual content in connection with the platform and process of FIG. 1, in accordance with an exemplary embodiment.

With reference to FIG. 4, in an exemplary embodiment, the target 129 is selected among several other potential targets along the roadside. In various embodiments, as part of the target selection process, an image is first rendered from an aerial mesh with the head pose (including position and orientation) in the WCS. Also in various embodiments, a 2D target 129 is selected in accordance with the target 129 position in the WCS. In addition, in various embodiments, corresponding potential targets are detected and matched between multiple images, such as images 399 and 400 depicted in FIG. 4. Also in various embodiments, the matching process is accelerated by comparing the 2D bounding box of the target 129. In certain embodiments, a contour detection algorithm is utilized to describe the bounding box. Next, in various embodiments, the selected target 129 is distinguished between other potential targets 401, 402 in the second image 400.

In various embodiments, the target 129 is selected based on its proximity to the vehicle 110 and/or one or more other specific characteristics, such as whether the target 129 has a blank space or region or is otherwise conducive to overlaying of virtual content on the target 129 and/or for providing content in an augmented fashion with respect to the targe 129, and/or whether the target 129 has subject matter that is conducive for overlaying of virtual content and/or for providing virtual content in an augmented fashion (e.g., if the target 129 includes text corresponding to traffic rules or regulations that could use enlarging or other enhancement for display to the users within the vehicle, and/or if the target 129 includes subject matter for information, advertisement, or the like that could be enhanced with an overlay of virtual content, and so on).

With reference back to FIG. 1, also in various embodiments, a video database 130 is obtained. In various embodiments, the video database 130 utilizes, as inputs, the information that is related to the vehicle and its users, such as a user's point of interest, the vehicle pose, and/or various other information. Also in various embodiments, as an output, the video database 130 includes a sequence of three dimensional (3D) frames that are to be delivered to the user. In various embodiments, the video database 130 includes 3D virtual content that is to be provided to users inside the vehicle as an overlay over the selected physical target 129 and/or in another augmented manner from the target selection 128. Also in various embodiments, the video database 130 includes a sequence of 3D mesh frames. In various embodiments, each mesh comprises a geometry that includes a collection of vertices and faces, along with texture information that is combined with the geometry to crease the mesh frames.

With continued reference to FIG. 1, in various embodiments, the 3D video database 130 is combined with the selected target 129 of the target selection 128 for level of detail (LOD) selection 132. In various embodiments, the LOD selection 132 refers to a level of detail of the 3D mesh to be provided to the user, including whether a simplified version of the 3D mesh would be appropriate in certain circumstances. In various embodiments, the LOD selection 132 includes, as inputs, the vehicle pose, and an availability of communication network bandwidth (including for delivering of 3D virtual content to the vehicle), and/or one or more other quality of experience (QOE) metrics (e.g., including possible delay, jitter, channel reliability, and so on). Also in various embodiments, an output of the LOD selection 132 includes a frame of simplified 3D mesh images that correspond to a chosen LOD.

Also in various embodiments, the selected LOD reduces the complexity and details of the 3D mesh depending on a distance from the user. For example, in certain embodiments, when the 3D mesh when the physical target 129 is relatively close to the user, the LOD may call for a 3D mesh with greater details (e.g., with a larger number of triangles), so as to increase an appropriate standard of quality of the 3D mesh for viewing by the user. Conversely, also in certain embodiments, when the physical target 129 is relatively far away from the user, the LOD may call for a 3D mesh with relatively lesser details (e.g., with a decreased number of triangles), so as to reduce complexities of the 3D mesh for viewing by the user. Also in certain embodiments, the selected LOD may call for a 3D mesh with greater details when the bandwidth is sufficiently larger, and to call for a 3D mesh with fewer details when the bandwidth is relatively smaller, and so on. In various embodiments, similar adjustments may likewise be made with respect to one or more other quality of experience (QOE) metrics (e.g., including possible delay, jitter, channel reliability, and so on).

Accordingly, in certain embodiments, the selection of the LOD may be based upon two principal rules, namely: (1) a distance-based rule that chooses LOD based on the physical distance between the user and the physical target; and (2) a bandwidth-based rule that chooses LOD based on the network bandwidth. In various embodiments, as a result: (i) a relatively abstract LOD is selected if the user is (1) distant from the target or (2) available network bandwidth is not sufficient. In various embodiments, the system prepares 3D videos for each LOD using a mesh decimation algorithm, and stores the various 3D videos in the 3D video database 130. In various embodiments, similar adjustments may likewise be made with respect to one or more other quality of experience (QOE) metrics (e.g., including possible delay, jitter, channel reliability, and so on).

Figure 5:
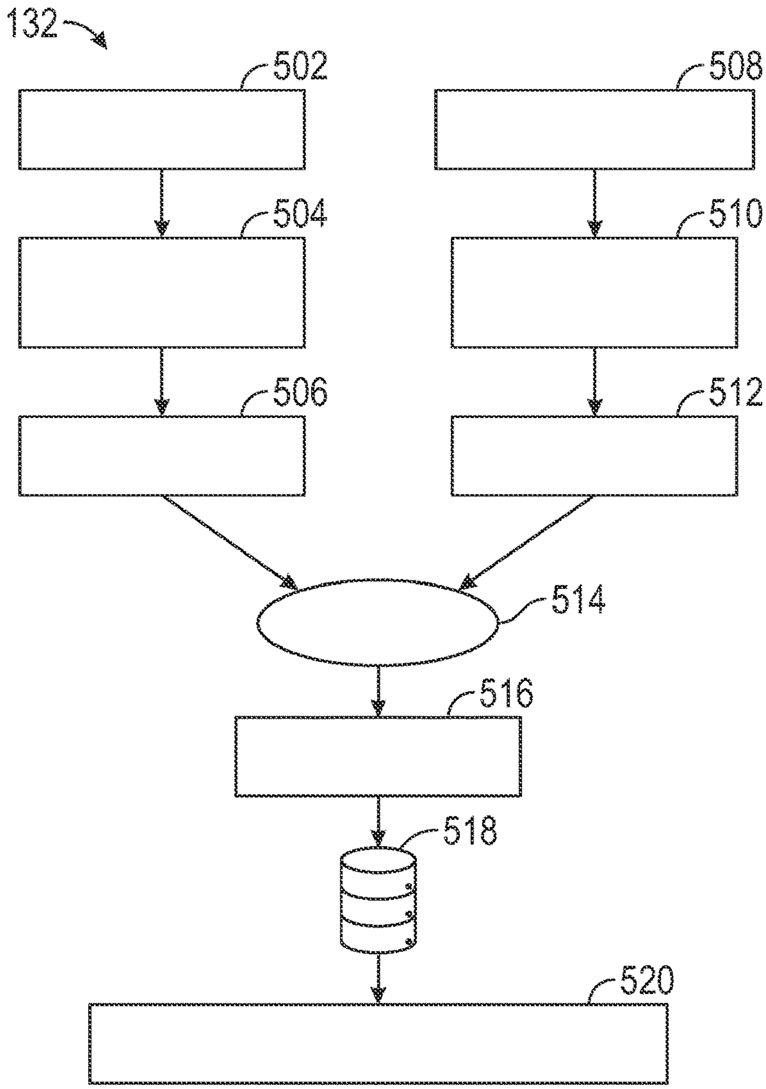
FIG. 5 depicts an exemplary implementation of the selection of a level of detail for the virtual content in connection with the platform and process of FIG. 1, in accordance with an exemplary embodiment.

With reference to FIG. 5, a flowchart is provided for an exemplary implementation of the LOD selection 132 of FIG. 1. As depicted in FIG. 5, a vehicle pose is provided at 502, and is implemented in connection with a distance-based rule at 504 in order to generate a first chosen LOD "A" at 506. In addition, also as depicted in FIG. 5, the network bandwidth 508 is implemented in connection with a bandwidth-based LOD rule (and/or one or more other QOE metric rules) at 510 in order to generate a second chosen LOD "B" at 512.

With continued reference to FIG. 5, in various embodiments the first chosen LOD "A" of 506 and the second chosen LOD "B" of 512 are considered together at 514. Specifically, in various embodiments, the minimum of the first chosen LOD "A" and the second chosen "LOD" is taken at 514 (e.g., whichever has the lowest level of detail) is chosen and is designated as the selected LOD at 516. In various embodiments, the selected LOD of 516 is integrated with a 3D mesh database at 518 in order to generate a 3D mesh frame with the chosen LOD at 520.

With reference back to FIG. 1, in various embodiments frustum and back-face culling is performed at 134. In various embodiments, frustum culling is performed by culling out the mesh (or portion thereof) that is outside of the viewer's perspective. Also in various embodiments, back-face culling is performed by removing certain features of the mesh (e.g., including certain vertices and triangles of the 3D mesh) that are not visible to the user. As used herein, the "viewer" and "user" both refer to occupants of the vehicle that are to view the display.

In certain embodiments, the frustum and back-face culling are performed by introducing a new data structure to efficiently calculate whether a given triangle is within the user's frustum and is culling is performed with adaptive resolution. Specifically, in certain embodiments, the mesh is converted from a Cartesian coordinate system to aspherical coordinate system in which the origin is the user's position, as follows:

$$(x,\ y,\ z) \text{ in Cartesian Coordinates} \rightarrow (\theta, \pi, r) \text{ in Spherical Coordinates} \quad \text{(Equation 2)}$$

Also in exemplary embodiments, an adaptive bin resolution is implemented. Specifically, in certain embodiments, the 3D space in spherical coordinates is divided into bins, wherein each bin holds at most one visible vertex. In certain embodiments, the division is based on bin resolution degree ($resolution_{bin}$) to account for various distances that may exist between the 3D object and the user. Specifically, in various embodiments, given the same (θ, π) angles, the 3D mesh will include (a) a relatively smaller number of vertices and faces when the 3D object is relatively close to the origin (e.g., to the user); whereas the 3D mesh conversely will instead include (b) a relatively larger number of vertices and faces when the 3D object is relatively farther from the origin (e.g., from the user). Accordingly, in various embodiments, a relatively smaller resolution angle is implemented when the 3D object is further from the user's position so that the bin converges the same or a similar portion of the mesh; whereas a relatively larger resolution angle is implemented when the 3D object is closer to the user's position.

Figure 6:
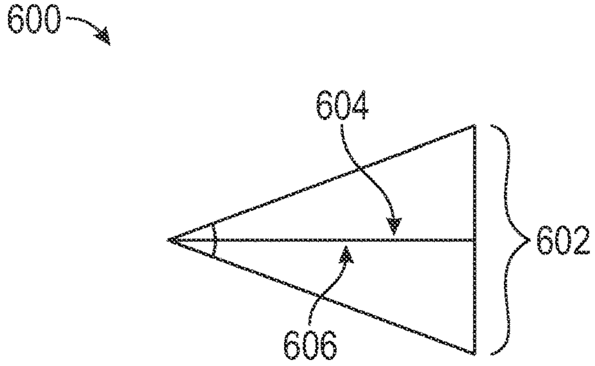
FIGS. 6 and 7 depict an exemplary implementation of the culling of the virtual content with the platform and process of FIG. 1, in accordance with an exemplary embodiment.

With reference to FIG. 6, in various embodiments, in accordance with a first algorithm, the frustum and back-face culling begins by, given a frame of 3D mesh ($F_t$), calculating the average distance of neighboring vertices ($d_{avg}$) 602 in $F_t$ (e.g., as denoted in illustration 600 of FIG. 6). Also in various embodiments, a distance is calculated between the target position and the user's position, namely, $R_{sphere}$ 604 as depicted in FIG. 6. In addition, in various embodiments, a bin resolution, namely, $resolution_{bin}$ 606 as depicted in FIG. 6, is calculated is calculated in accordance with the following equation:

$$resolution_{bin} = 2\arctan\left(\frac{d_{avg}}{2R_{sphere}}\right). \qquad \text{(Equation 3)}$$

In various embodiments, this methodology ensures that each bin has at most one vertex given a particular resolution value. In addition, also in various embodiments, after obtaining the $resolution_{bin}$, this methodology can assign a corresponding bin index to each vertices in $F_t$.

In addition, in certain embodiments, the back-face and frustum culling may also be implemented in connection with a second algorithm. In this second algorithm, in certain embodiments, given a particular value for both $F_t$ and $resolution_{bin}$, then for each vertex ($v_i$) in $F_t$, then a bin ($\pi_i$, $\theta_i$) index of $v_i$ may be generated using the first algorithm above. Also in certain embodiments, frustum culling is performed, and continues, when the current bin is outside of the user's frustum. Also in various embodiments, back-face culling is performed based on whether the bin ($\pi_i$, $\theta_i$) is empty. Specifically, in various embodiments, (A) when the bin ($\pi_i$, $\theta_i$) is empty, then $v_i$ is added to the current bin; and (B) otherwise $v_j$ is used to represent the vertex in the current bin, the distance to the origin is compared for both $v_i$ and $v_j$, and the vertex is updated to be the closer vertex of the return visited bins.

Figure 7:
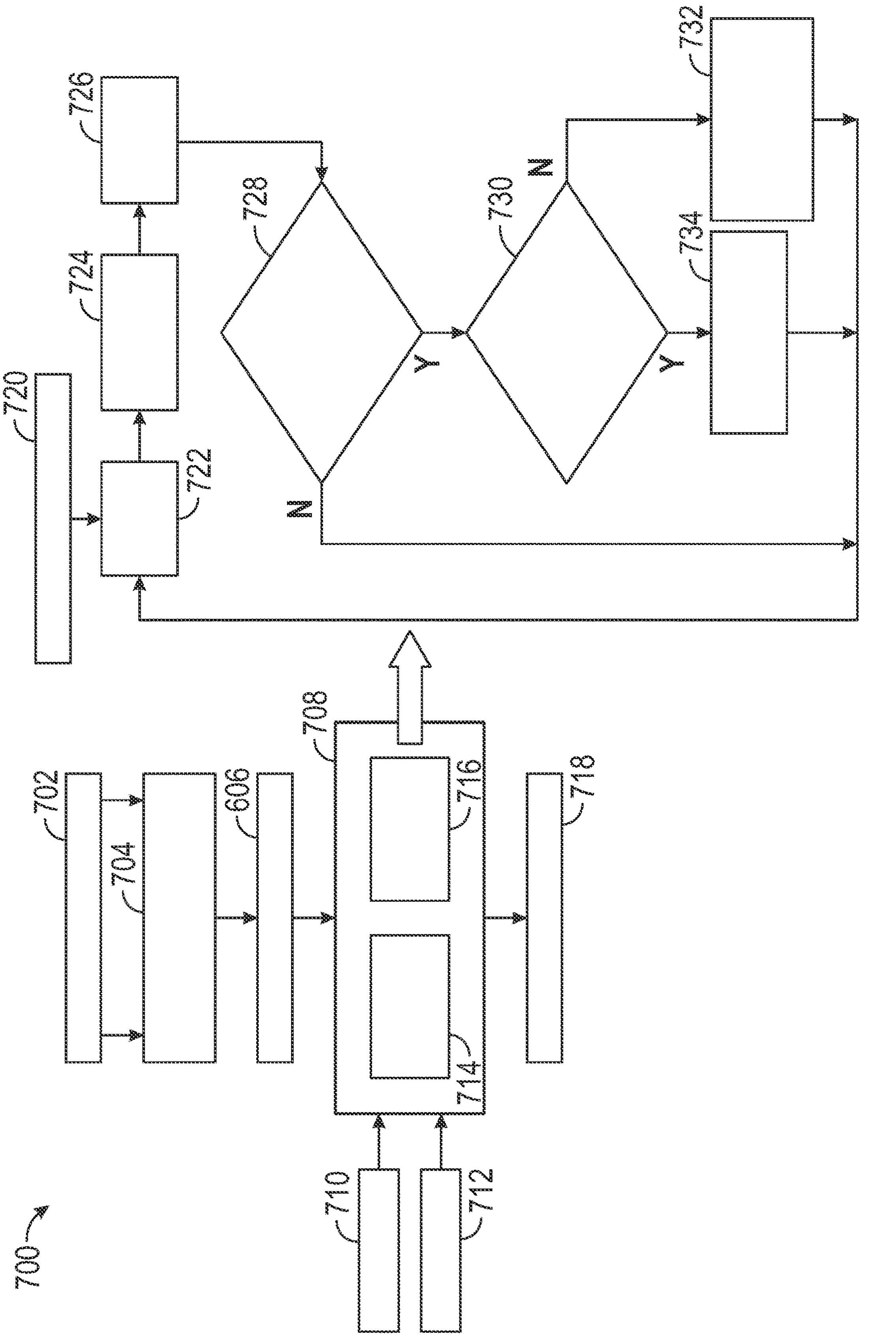

With reference to FIG. 7, a flowchart is provided for an exemplary embodiment of the frustum and back-face culling of 134 of FIG. 1. As depicted in FIG. 7, an exemplary culling process 700 includes, in various embodiments, the generating of a 3D mesh at 702. In various embodiments, the 3D mesh of the vehicle pose is utilized to calculate a bin resolution at 704. In various embodiments, the calculation of 704 results in the $resolution_{bin}$ 606 value as described above.

Also as depicted in FIG. 7, in various embodiments, the bin resolution 606 is combined with the 3D mesh 710 and head pose 712 for culling 708, including both frustum culling 714 and back-face culling 716 as discussed above. In various embodiments, the culling 708 results in a culled 3D mesh. In addition, as depicted in FIG. 7, in various embodiments, the culling 708 is utilized in connection with a representation of the 3D mesh in spherical coordinates 720 to generate a vertex "i" (with x, y, and z coordinates) at 722. Also as depicted in FIG. 7, in various embodiments a spherical conversion is then performed at 724, thereby generating a bin index (θ, π) at 726.

In various embodiments, a determination is made at 728 to determine whether the bin index (θ, π) is within a user's head pose. If it is determined at 728 that the bin index is not within the user's head pose, then the process returns to the above-described 722.

Conversely, if it is determined at 728 that the bin index is within the user's head pose, then the process proceeds to 730, in which a determination is made as to whether the bin index (θ, π) already has a vertex. If it is determined in step 720 that the bin index (θ, π) does not have a vertex, then in various embodiments the current vertex is added to the bin at 732, after which the process returns to the above-described 722. Conversely, if it is determined in step 720 that the bin index (θ, π) already has a vertex, then in various embodiments the bin is updated accordingly as necessary at 734, after which the process returns to the above-described 722.

With reference back to FIG. 1, in various embodiments additional compression is performed at 136. In various embodiments, after the culling of 134, further compression is performed at 136, including encoding and decoding to further reduce the size of the 3D mesh to be transmitted to the vehicle. In certain embodiments, the further compression of 134 includes utilizing a list of vertices and faces in a 3D mesh frame along with connectivity information (in certain embodiments, using a Draco per frame encoding technique) that generates an encoded output (e.g., in one embodiment, including an encoded binary output). Also in certain embodiments, frames of texture files are also utilized with one or more compression techniques for generating encoded video for the 3D mesh.

With continued reference to FIG. 1, in various embodiments, the resulting 3D compressed output is rendered at 138. Specifically, in various embodiments, a 3D video rendering is provided for each vehicle 110 of FIG. 1 using one or more display devices 139 (e.g., one or more display screens, head-up display devices, or the like) of the vehicle 110, thereby resulting in the above-referenced display 140 of the virtual 3D video content overlayed onto the selected roadside target and/or in another augmented manner with respect to the selected roadside target.

Accordingly, as described above, the platform and process 100 (and the various embodiments described herein) utilize images from inside the vehicle (e.g., including from a driver monitoring system of the vehicle) in conjunction with a database of images and other information in order to deliver virtual content that is overlayed onto one or more physical selected roadside elements and/or in another augmented manner as presented via one or more display devices of the vehicle (e.g., one or more display screens, head-up display elements, or the like). Also in various embodiments, as discussed above, the platform and process 100 utilize target selection and bin-based culling and LOD selection, including by integrating vehicle signals such as vehicle image data, vehicle sensor data, GPS data, and other information.

As referenced above, FIG. 2 is a functional block diagram of a system 200 for delivering content for users of a vehicle, and that can be used for implementation of the platform and process 100 of FIG. 1 and the implementations of FIGS. 3-7, in accordance with exemplary embodiments. As depicted in FIG. 2, in various embodiments, the system 200 may include a vehicle control system 202, a remote system 204, a communication network 206, and one or more third party services 208.

In various embodiments, the vehicle control system 202 is part of the vehicle 110 of FIG. 1. In certain embodiments, a separate vehicle control system 202 may be included within and as part of each corresponding vehicle 110. As depicted in FIG. 2, in various embodiments the vehicle control system 202 includes a sensor array 210, a transceiver 214, a display 216, and a controller 218.

In various embodiments, the sensor array 210 includes various sensors for operation of the vehicle 110, and including for obtaining sensor data that is used for the platform and process 100 of FIG. 1. In various embodiments, the sensor array 210 includes one or more location sensors 222 (e.g., as part of a GPS and/or other location system), IMU sensors 224 (e.g., as part of an inertial measurement unit of the vehicle 110), and image sensors 226 (e.g., that include cameras as part of a driver monitoring system and/or that otherwise obtain camera images of the driver and other users/passengers inside the vehicle 110, as well as additional cameras that obtain camera images of the roadway and surrounding environment outside the vehicle 110).

In various embodiments, the transceiver 214 is utilized to communicate with the remote server (e.g., that houses the remote system 204) as well as, in certain embodiments, one or more third party services 208 (e.g., that provide, by way of example, weather data, traffic data, or the like in certain embodiments). For example, in various embodiments, the transceiver 214 is utilized to transmit sensor data from the vehicle, and to receive 3D virtual content for display for users of the vehicle 110. Also in various embodiments, the communication network 206 may include any number of different types of wireless communications networks, such as cellular, satellite, Internet and cloud based networks, and the like.

Also in various embodiments, the display 216 of the vehicle 110 is utilized for display of content for users inside the vehicle 110, including the 3D virtual content that is overlayed over the physical selected roadside target and/or in another augmented manner for display for the vehicle 110's users. In certain embodiments, the display corresponds to the display device 139 described above in connection with FIG. 1. Also in various embodiments, the display device 139 may comprise a physical display screen (such as a drop down screen, in-mirror display element, in-windshield display element, for example as part of a rear view display, forward display, head-up display, and/or one or more of any number of different types of displays for users of the vehicle 110).

In various embodiments, the controller 218 comprises a computer system of the vehicle 110 that performs certain processing functions of the process 100 and implementations as described above. In certain embodiments, certain processing functions are performed within the controller 218 of the vehicle 110, whereas other processing functions are performed instead via a controller 248 of the remote system 204 (as described further below). In certain other embodiments, the processing functions may be performed exclusively by one of the controller 218 or controller 248.

As depicted in FIG. 2, in certain embodiments, the controller 218 of the vehicle 110 includes a processor 230, a memory 232, an interface 234, a storage device 236, and a bus 238. The processor 230 performs the computation and control functions of the controller 218, and may comprise any type of processor or multiple processors, single integrated circuits such as a microprocessor, or any suitable number of integrated circuit devices and/or circuit boards working in cooperation to accomplish the functions of a processing unit. During operation, the processor 230 executes one or more programs 240 contained within the memory 232 and, as such, controls the general operation of the controller 218 generally in executing the processes described herein, such as the process 100 of FIG. 1 and implementations of FIGS. 3-8 and described herein.

The memory 232 can be any type of suitable memory, including various types of non-transitory computer readable storage medium. In certain examples, the memory 232 is located on and/or co-located on the same computer chip as the processor 230. In the depicted embodiment, the memory 232 stores the above-referenced program 240 along with stored values 242 (e.g., stored images and/or other information).

The interface 234 allows communication to the computer system of the controller 218, for example from a system driver and/or another computer system, and can be implemented using any suitable method and apparatus. In one embodiment, the interface 234 obtains the various data from the sensor array 210, the remote system 204, and/or the third party services 208, among other possible data sources. The interface 234 can include one or more network interfaces to communicate with other systems or components. The interface 234 may also include one or more network interfaces to communicate with technicians, and/or one or more storage interfaces to connect to storage apparatuses, such as the storage device 236.

The storage device 236 can be any suitable type of storage apparatus, including various different types of direct access storage and/or other memory devices. In one exemplary embodiment, the storage device 236 comprises a program product from which memory 232 can receive a program 240 that executes one or more embodiments of one or more processes of the present disclosure, such as the steps of the process 100 of FIG. 1 and implementations thereof and described herein. In another exemplary embodiment, the program product may be directly stored in and/or otherwise accessed by the memory 232 and/or a disk (e.g., disk 244), such as that referenced below.

The bus 238 serves to transmit programs, data, status and other information or signals between the various components of the computer system of the controller 218. The bus 238 can be any suitable physical or logical means of connecting computer systems and components. This includes, but is not limited to, direct hard-wired connections, fiber optics, infrared and wireless bus technologies. During operation, the program 240 is stored in the memory 232 and executed by the processor 230.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 230) to perform and execute the program.

Also as depicted in FIG. 2, in exemplary embodiments the remote system 204 includes a transceiver 246 and a controller 248, among other possible components. In various embodiments, the transceiver 246 is similar to the transceiver 214 of the vehicle 110, and is used for the remote system 204 to communicate with the vehicles 110 and, in certain embodiments, to the third party services 208 via the communication network 206. In certain embodiments, the transceiver 246 receives sensor data from the vehicle 110, and delivers 3D virtual content from the remote system 204 to the vehicle 110.

Also in various embodiments, the controller 248 is similar to the above-described controller 218 of the vehicle 110. In various embodiments, the controller 248 has a processor 250, along with a memory 252 that stores one or more programs 260 and stored values 262, with functions that are similar or identical to those described above in connection with the controller 218, processor 230, memory 232, programs 240, and stored values 242 with reference to the vehicle 110. Also in various embodiments, the controller 248 may also include other components, such as those described above in connection with the controller 218, among other possible components. In addition, in various embodiments, the controller 248 processes the sensor data and other information (including from the vehicle 110 and any third party services 208) in order to generate and deliver, for the vehicle 110, virtual 3D content for display within the vehicle 110 as an overlay to one or more physical targets and/or in another augmented manner with respect to the physical targets that are selected from along the roadside. As noted above, in various embodiments the processing steps of the process 100 and implementations thereof are performed via the controller 248 of the remote system 204, whereas in certain embodiments such processing steps may also be performed in whole or in part via the controller 218 of the vehicle 110.

It will be appreciated that the systems, vehicles, and methods may vary from those depicted in the Figures and described herein. For example, the platform and process 100 of FIG. 1 may differ from that depicted in FIG. 1. It will similarly be appreciated that the system 200 of FIG. 2 and/or components thereof may differ from those depicted in FIG. 2 and/or described herein. It will also be appreciated that the implementations of FIGS. 3-7 may differ from those depicted in the drawings and/or as described herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining sensor data from one or more sensors of a vehicle;

selecting, via a processor using the sensor data, a physical target that comprises a physical element in proximity to the vehicle as the vehicle is travelling, based on a rendering of an image from an aerial mesh in addition to a head pose of a driver of the vehicle, the head pose including a position and orientation of a head of the driver;

generating, via the processor, virtual content based on the sensor data, based on the image from the aerial mesh in addition to the head pose of the driver; and delivering the virtual content for one or more users of the vehicle as an overlay to the physical target and in an augmented fashion to the physical target;

wherein the method further comprises:

performing, via the processor, frustum and back-face culling of the aerial mesh, including by:

introducing a new data structure that calculates whether a given triangle is within a frustrum of the user, including by converting from a Cartesian coordinate system to a spherical coordinate system having a three dimensional space in which the origin is the user's position, as follows: (x, y, z) in Cartesian Coordinates→(θ, π, r) in Spherical Coordinates; and performing culling using adaptive resolution, including by dividing the three dimensional space in spherical coordinates into a plurality of bins, wherein each bin holds at most one visible vertex, and wherein the division is based on a bin resolution degree to account for a plurality of distances that may exist between a three dimensional object and the user, such that given the same (θ, π) angles, the aerial mesh will include (a) a relatively smaller number of vertices and faces when the three dimensional object is relatively close to the origin and to the user, and whereas the aerial mesh conversely will instead include (b) a relatively larger number of vertices and faces when the three dimensional object is relatively farther from the origin and the user; and further wherein a relatively smaller resolution angle is implemented when the three dimensional object is further from the user's position so that the bin converges to the same portion of the aerial mesh; and whereas a relatively larger resolution angle is implemented when the three dimensional object is closer to the user's position.

2. The method of claim 1, wherein:

the sensor data comprises image sensor data, location sensor data, and inertial measurement unit (IMU) sensor data obtained from the vehicle;

the method further includes generating, via the processor, the head pose and a vehicle pose, based on the image sensor data, the location sensor data, and the IMU sensor data obtained from the vehicle; and the generating of the virtual content is performed using the head pose and the vehicle pose.

3. The method of claim 2, wherein the generating of the virtual content is performed further using a three dimensional image database that is stored in a computer storage, in combination with the head pose and the vehicle pose.

4. The method of claim 1, wherein the virtual content is displayed for the one or more users of the vehicle on one or more display screens inside the vehicle.

5. The method of claim 1, wherein:

the physical target comprises a billboard along a roadway in which the vehicle is travelling; and the virtual content is overlayed over, and presented in an augmented manner with respect to, the billboard as displayed inside the vehicle for the one or more users.

6. The method of claim 1, wherein:

the physical target comprises a traffic control device along a roadway in which the vehicle is travelling; and the virtual content is overlayed over, or presented in an augmented manner with respect to, the traffic control device as displayed inside the vehicle for the one or more users.

7. The method of claim 1, wherein:

the physical target comprises a point of interest along a roadway in which the vehicle is travelling; and the virtual content is overlayed in an augmented manner with respect to, the point of interest.

8. The method of claim 1, wherein:

the physical target comprises a road condition object along a roadway in which the vehicle is travelling; and the virtual content is overlayed over, or presented in an augmented manner with respect to, the road condition object, as displayed inside the vehicle for the one or more users.

9. The method of claim 8, wherein:

the physical target and road condition object comprises a pothole along the roadway in which the vehicle is travelling; and the virtual content is overlayed over, or presented in an augmented manner with respect to, the pothole, as displayed inside the vehicle for the one or more users.

10. The method of claim 1, wherein the virtual content is displayed for the one or more users of the vehicle on one or more drop down display screens inside the vehicle.

11. The method of claim 1, wherein the virtual content is displayed for the one or more users of the vehicle on one or more in-mirror display screens inside the vehicle.

* * * * *